United States Patent
Ikeda et al.

(10) Patent No.: US 12,500,221 B2
(45) Date of Patent: Dec. 16, 2025

(54) METHOD OF MANUFACTURING ELECTRODE

(71) Applicant: TOYOTA JIDOSHA KABUSHIKI KAISHA, Toyota (JP)

(72) Inventors: Takenori Ikeda, Owariasahi (JP); Satoshi Moriyama, Nagoya (JP); Shugo Daikuhara, Nisshin (JP); Takeshi Kondo, Kariya (JP); Tomoyuki Tasaki, Kariya (JP); Tomokuni Abe, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 540 days.

(21) Appl. No.: 17/932,746

(22) Filed: Sep. 16, 2022

(65) Prior Publication Data

US 2023/0170460 A1 Jun. 1, 2023

(30) Foreign Application Priority Data

Nov. 29, 2021 (JP) .................................. 2021-193165

(51) Int. Cl.
*H01M 4/04* (2006.01)
(52) U.S. Cl.
CPC .................................. *H01M 4/0435* (2013.01)

(58) Field of Classification Search
CPC ............. H01M 10/0583; H01M 4/364; H01M 10/0587; H01M 4/0409; G01B 7/087
See application file for complete search history.

(56) References Cited

U.S. PATENT DOCUMENTS

| | | | | |
|---|---|---|---|---|
| 3,210,160 A | * | 10/1965 | Gordon | C06B 31/32 422/198 |
| 2005/0285080 A1 | * | 12/2005 | Suzuki | H01M 4/624 252/182.1 |
| 2018/0287138 A1 | | 10/2018 | Miura | |
| 2023/0170460 A1 | * | 6/2023 | Ikeda | H01M 4/0409 29/623.1 |

FOREIGN PATENT DOCUMENTS

| | | | | |
|---|---|---|---|---|
| JP | 2002-184405 A | | 6/2002 | |
| JP | 2016115578 A | | 6/2016 | |
| JP | 2017134911 A | * | 8/2017 | |
| JP | 2018010854 A | * | 1/2018 | ........... B05C 1/0808 |
| JP | 2018032604 A | | 3/2018 | |
| JP | 2018-170222 A | | 11/2018 | |

* cited by examiner

*Primary Examiner* — Minh N Trinh
(74) *Attorney, Agent, or Firm* — SoraIP, Inc.

(57) ABSTRACT

A method of manufacturing an electrode includes a step of preparing a granulated material containing an electrode active material, a binder, and a solvent, a step of compressing the granulated material between a pair of rolls, to form an electrode composite layer, and a step of placing the electrode composite layer on an electrode current collector. At least one of the pair of rolls has a temperature of 40° C. or higher.

12 Claims, 4 Drawing Sheets

METHOD OF MANUFACTURING ELECTRODE

CROSS-REFERENCE TO RELATED APPLICATION

This application claims priority to Japanese Patent Application No. 2021-193165 filed on Nov. 29, 2021, incorporated herein by reference in its entirety.

BACKGROUND

1. Technical Field

The disclosure relates to a method of manufacturing electrodes.

2. Description of Related Art

For example, in Japanese Unexamined Patent Application Publication No. 2018-032604 (JP 2018-032604 A), an electrode manufacturing method is known in which sheet-like electrodes used in lithium-ion secondary batteries, etc. are produced by a method (granulated material forming method), specifically, by preparing a granulated material containing an electrode composite material, forming the granulated material into an electrode composite layer, and placing the electrode composite layer on an electrode current collector.

SUMMARY

When producing electrodes by the granulated material forming method, further improvements in the productivity are required. To improve the productivity, it is desirable to improve the spreadability of the granulated material.

The disclosure provides a method of manufacturing an electrode, which makes it possible to produce granulated material having improved spreadability.

A method of manufacturing an electrode as a first aspect of the disclosure includes preparing a granulated material containing an electrode active material, a binder, and a solvent, compressing the granulated material between a first roll and a second roll, to form an electrode composite layer, and placing the electrode composite layer on an electrode current collector. In the method of manufacturing the electrode as the first aspect, at least one of the first roll and the second roll has a temperature of 40° C. or higher.

According to the method as the first aspect of the disclosure, the electrode can be manufactured using the granulated material having improved spreadability.

Specifically, the granulated material is heated when it is compressed between a pair of rolls, i.e., the first roll and the second roll, at least one of which has a temperature of 40° C. or higher, so that the viscosity of the binder dissolved in the solvent contained in the granulated material is reduced. As a result, in the granulated material, the area of a portion of the surface of the electrode active material that is wetted by the solvent (or a mixture of the solvent and the binder) is increased, and the spreadability of the electrode active material is improved.

In the method of manufacturing the electrode as the first aspect of the disclosure, the temperature of the first roll and the temperature of the second roll may be equal to or higher than 40° C.

Since the temperatures of the first roll and the second roll are both equal to or higher than 40° C., the granulated material is efficiently heated.

In the method of manufacturing the electrode as the first aspect of the disclosure, the granulated material may have a solid content percentage that is equal to or greater than 75 mass % and equal to or less than 90 mass %.

In this case, the granulated material has good spreadability and good liquid retainability, which facilitates the manufacture of electrodes using the granulated material, and improves productivity in the manufacture of electrodes.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

One embodiment of the disclosure will be described. However, the disclosure is not limited to the embodiment. In this specification, "positive electrode" and "negative electrode" will be collectively referred to as "electrode".

Figure 1:
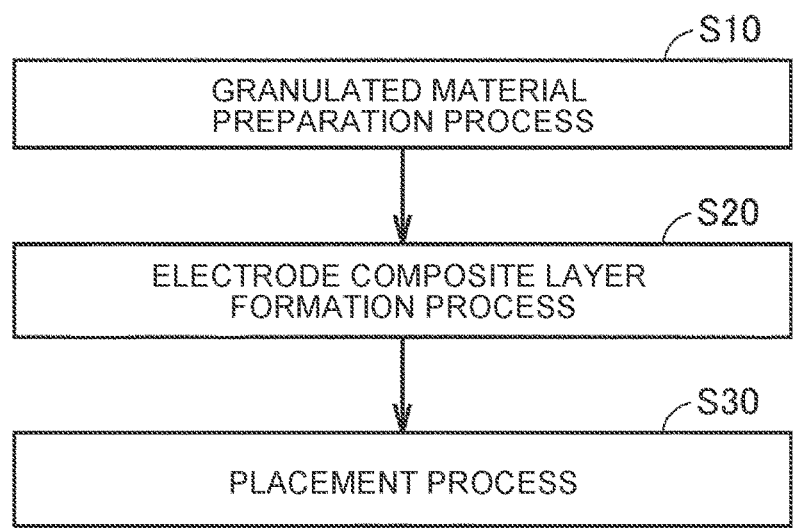
FIG. 1 is a flowchart schematically showing a method of manufacturing electrodes in an embodiment.

FIG. 1 is a flowchart schematically showing a method of manufacturing electrodes according to the embodiment. As shown in FIG. 1, the electrode manufacturing method of this embodiment includes at least the granulated material preparation process (S10), electrode composite layer formation process (S20), and placement process (S30).

The electrodes manufactured in this embodiment are, for example, sheet-like electrodes (electrode sheets) used for lithium-ion secondary batteries. The electrodes may be either positive electrodes or negative electrodes.

Granulated Material Preparation Process (S10)

In the granulated material preparation process, a granulated material (wet granulated material) containing an electrode active material, a binder, and a solvent is prepared. The granulated material is an aggregate of a plurality of granulated particles (composite particles) including the electrode active material, binder, and solvent.

For example, the granulated material can be prepared by mixing (granulating) the electrode active material, binder, solvent, etc. For example, an agitation granulation method can be used as a granulation method. Various granulation operations used in the process of preparing the granulated material include, for example, agitation granulation, fluidized bed granulation, and rolling granulation. Various types of granulation devices, such as an agitation mixing device, can be used for the granulation operations. When the agitation mixing device has agitating blades (rotor blades), the rotational speed of the agitating blades is, for example, about 200 to 5000 rpm.

Electrode Active Material

The electrode active material may be a positive-electrode active material or a negative-electrode active material. The electrode active material may be in particle form or may be porous active material particles formed by aggregation of primary particles consisting of the electrode active material.

Examples of the positive-electrode active material include lithium-containing metal oxides, lithium-containing phosphates, and so forth. The lithium-containing metal oxides include, for example, $LiCoO_2$, $LiNiO_2$, compounds represented by the general formula $LiNi_aCo_bO_2$ (where a+b=1, 0<a<1, and 0<b<1), $LiMnO_2$, $LiMn_2O_4$, compounds represented by the general formula $LiNi_aCo_bMn_cO_2$ (where a+b+c=1, 0<a<1, 0<b<1, and 0<c<1), $LiFePO_4$, etc. Here, one example of the compounds represented by the general formula $LiNi_aCo_bMn_cO_2$ is $LiNi_{1/3}Co_{1/3}Mn_{1/3}O_2$. The lithium-containing phosphates include, for example, $LiFePO_4$, etc.

The average particle diameter of the positive-electrode active material is, for example, about 1 to 25 μm. The "average particle diameter" mentioned herein means the particle diameter (D50) at 50% integrated value in the volume-based particle size distribution measured by the laser diffraction and scattering method.

Examples of the negative-electrode active material include carbon-based negative-electrode active materials, such as graphite, easily graphitizable carbon, and hardly graphitizable carbon, and alloy-based negative-electrode active materials containing silicon (Si), tin (Sn), etc. The average particle diameter (D50) of the negative-electrode active material may be, for example, about 1 to 25 μm.

The ratio of the electrode active material to the total solid content of the granulated material (i.e. the content percentage of the electrode active material in the electrode composite layer) is, for example, about 94 to 99.7 mass %.

Binder

Examples of the binder include carboxymethyl cellulose (CMC), styrene butadiene rubber (SBR), polyvinylidene fluoride (PVDF), polytetrafluoroethylene (PTFE), and polyacrylic acid (PAA). One type of binder may be used alone, or two or more types of binders may be used in combination.

The ratio of the binder to the total solid content of the granulated material (i.e., the content percentage of the binder in the electrode composite layer) is, for example, about 0.3 to 6 mass %.

Solvent

Examples of the solvent include an aqueous solvent and an organic solvent. The aqueous solvent means water, or a mixed solvent containing water and a polar organic solvent.

As the aqueous solvent, water can be suitably used for ease of handling. Examples of the polar organic solvent that can be used in the mixed solvent include, for example, alcohols such as methanol, ethanol, and isopropyl alcohol, ketones such as acetone, and ethers such as tetrahydrofuran. The aqueous solvent can be suitably used as a solvent for the manufacture of negative electrodes.

Examples of the organic solvent include N-methyl-2-pyrrolidone (NMP), etc. The organic solvent can be suitably used as a solvent for the manufacture of positive electrodes.

While the amount of the solvent used is not limited to any particular amount, the solid content percentage (the non-volatile content percentage) of the granulated material is preferably 75 to 90 mass %, more preferably 80 to 86 mass %, even more preferably 82 to 84 mass %. In this case, the granulated material retains liquid well, and an electrode composite layer 12 can be more reliably transferred to an electrode current collector 13 on a third roll 33, in the placement process (S30) that will be described later. In this connection, the "solid content percentage" means the ratio of the mass of components (non-volatile components) other than the solvent to the total mass of all raw materials including the solvent.

Furthermore, in this case, the granulated material has both good spreadability and good liquid retainability, which facilitates the manufacture of electrodes using the granulated material, and improves the productivity in the manufacture of electrodes.

Conventionally, in order to obtain a granulated material having both desirable spreadability and liquid retainability to improve the productivity in the manufacture of electrodes, adjustment of the types of materials constituting the granulated material, mixing ratio, etc. has been considered. However, it was difficult for such adjustment to achieve the granulated material having both desirable spreadability and liquid retainability.

More specifically, a condition of spreadability of the granulated material necessary for easy manufacture of electrodes is, for example, that the spreadability evaluation value (see Examples below) is equal to or smaller than a specified threshold value (220 μm). The threshold value of the spreadability evaluation value is obtained from the results of production of electrodes actually using granulated materials having various degrees of spreadability, and is determined so as to prevent unevenness (non-uniformity) and transparency (deficiency) in the electrode composite layer provided on the electrode current collector.

A condition of liquid retainability of the granulated material necessary for easy manufacture of electrodes is, for example, that the exudation rate (see Examples below) is equal to or less than a specified threshold value (5 mass %). The threshold value of the exudation rate is obtained from the results of production of electrodes actually using granulated materials having various degrees of liquid retainability, and is determined so that the electrode composite layer is sufficiently attached to the electrode current collector.

Figure 5:
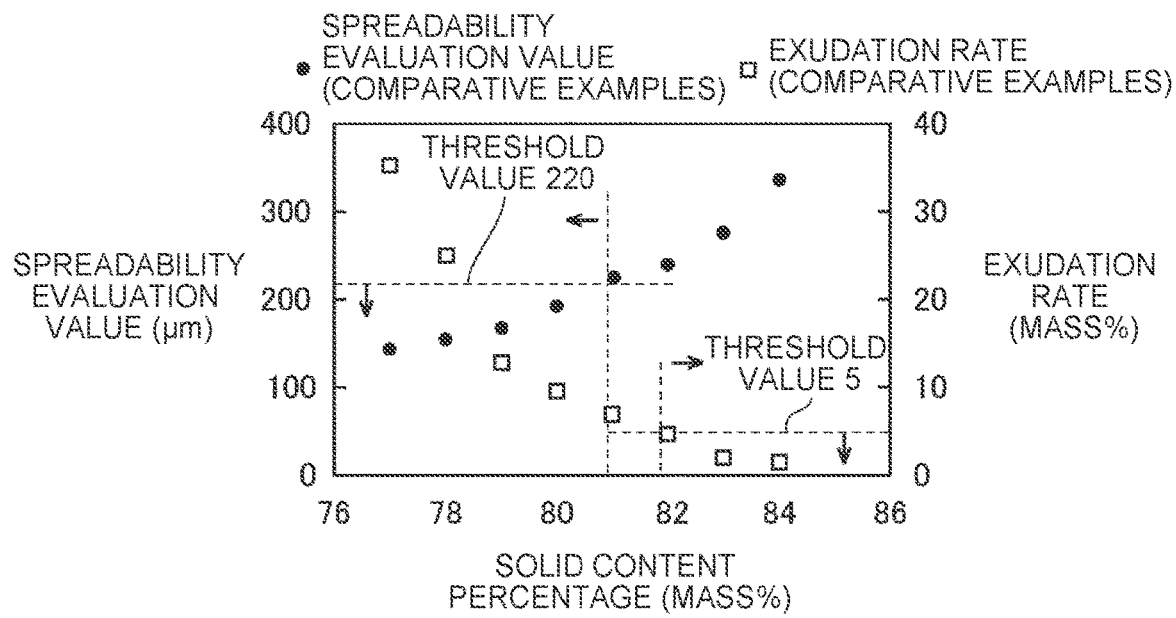
FIG. 5 is a graph showing the relationship between the solid content percentage, spreadability, and liquid retainability, for granulated materials of Comparative Examples (related art)

FIG. 5 is a graph showing the relationship between the solid content percentage, spreadability evaluation value, and exudation rate, for granulated materials of the related art (granulated materials of Comparative Examples 1-8 as described later) that are not subjected to heating. Referring to FIG. 5, the solid content percentage of the granulated material when the spreadability evaluation value of the granulated material is equal to or smaller than the threshold value (220 μm) is less than about 81%. In the meantime, the solid content percentage of the granulated material when the liquid retainability of the granulated material is equal to or less than the threshold value (5 mass %) is equal to or above about 82 mass %. Thus, it is found difficult to obtain a granulated material of which both the spreadability (spreadability evaluation value) and the liquid retainability (exudation rate) satisfy conditions necessary for easy manufacture of electrodes, only through adjustment of the material composition, etc. in the granulated material of the related art.

On the other hand, by heating the granulated material of this embodiment in the electrode composite layer formation process as described later, it is possible to obtain a granulated material having both good spreadability and good liquid retainability, which can facilitate the manufacture of electrodes and improve the productivity (see Examples that will be described later, in particular, Examples 6 and 7 indicated by white triangles in FIG. 6).

Other Components

The granulated material may contain other components, such as a conductive material, than those as indicated above. Examples of the conductive material include, for example, carbon blacks, such as acetylene black (AB), thermal black, and furnace black. With the conductive material thus contained, the electron conductivity is expected to be improved.

Electrode Composite Layer Formation Process (S20)

In the electrode composite layer formation process, the granulated material is compressed between a pair of rolls, to form the electrode composite layer. For example, the granulated material obtained in the above granulated material preparation process is supplied between a pair of rolls that are arranged in parallel with each other with a spacing therebetween and are respectively rotated, and the granulated material is compressed between the pair of rolls, to form the electrode composite layer. More specifically, as shown in FIG. 2 and FIG. 3, the granulated material 10 is supplied to a first gap between a first roll 31 and a second roll 32, and the granulated material 10 is compressed and formed into the electrode composite layer 12.

Figure 2:
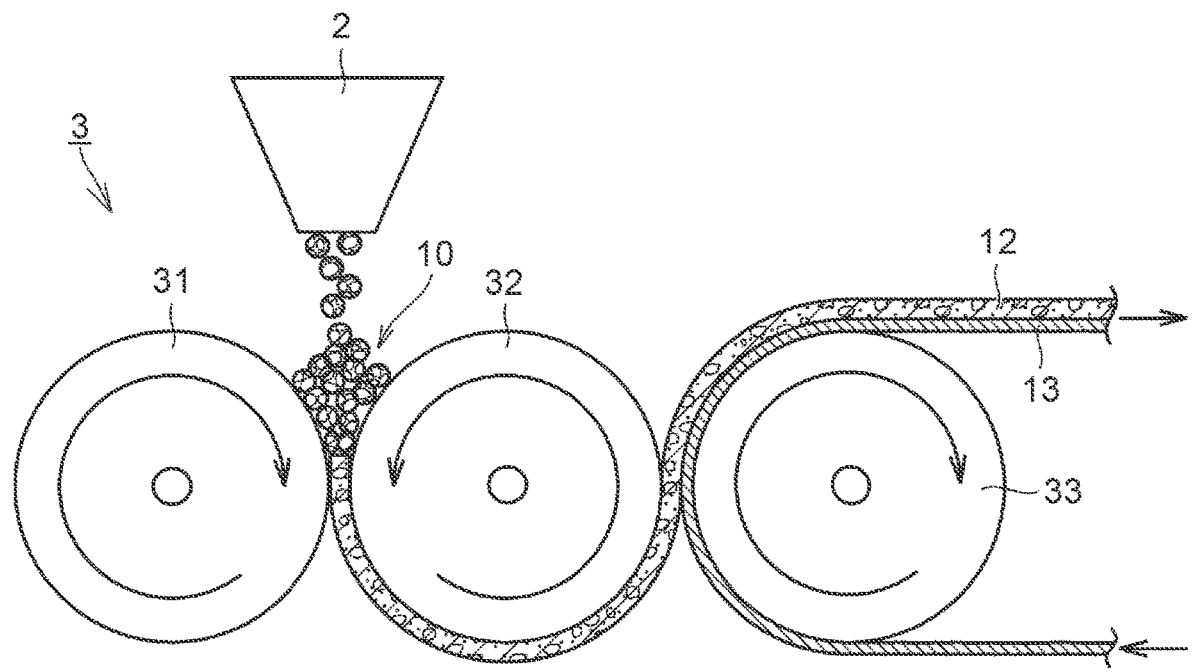
FIG. 2 is a conceptual diagram showing an apparatus used for the manufacture of electrodes in the embodiment.
Figure 3:
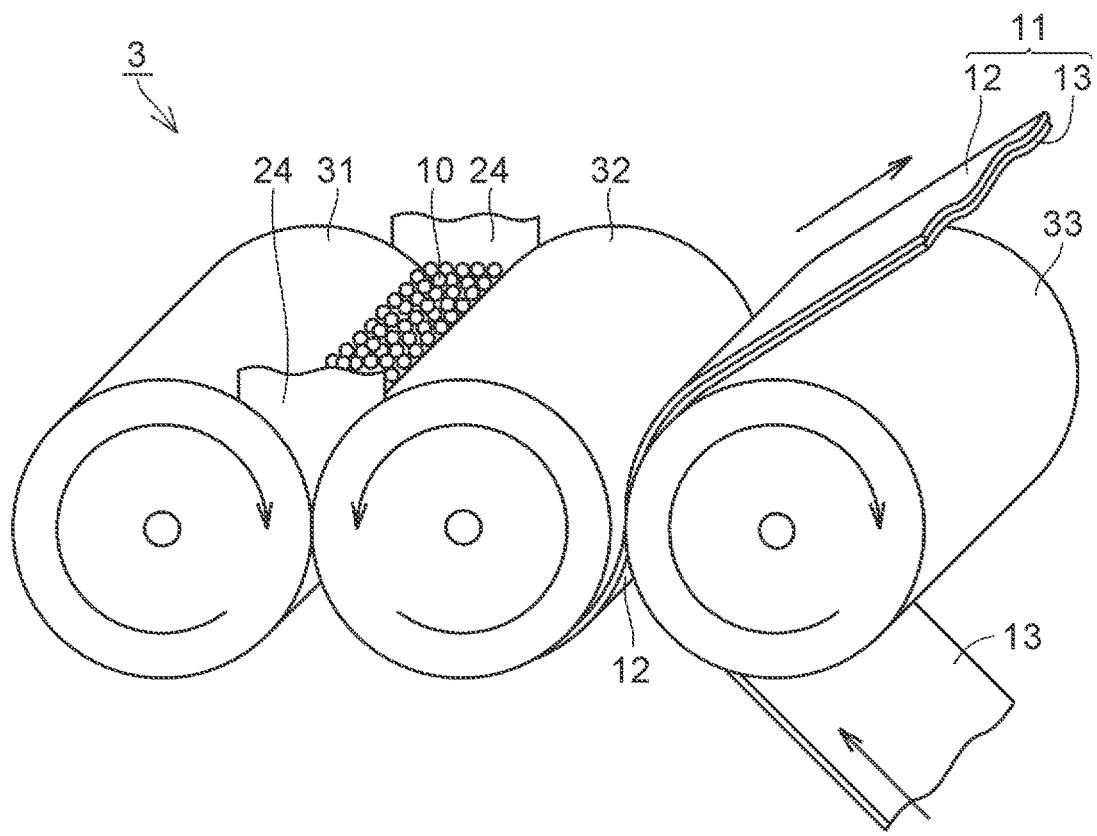
FIG. 3 is a schematic perspective view showing the apparatus used for the manufacture of electrodes in the embodiment.

In the electrode manufacturing method of this embodiment, an electrode manufacturing apparatus 3 as shown in FIG. 2 and FIG. 3 is used. The electrode manufacturing apparatus 3 includes a feeder 2 and three rolls (first roll 31, second roll 32, third roll 33). The diameter of each of the first roll 31, second roll 32, and third roll 33 is, for example, 10 to 1000 mm, and the axial length of each of the rolls is, for example, 100 to 2000 mm.

The first roll 31, second roll 32, and third roll 33 are fixed such that the respective rotational axes of the first roll 31, second roll 32, and third roll 33 are parallel to each other. The distance (width) of the first gap between the first roll 31 and the second roll 32 is kept constant. The distance of the second gap between the second roll 32 and the third roll 33 is also kept constant. The first roll 31, second roll 32, and third roll 33 are respectively driven to be rotated. In FIG. 2 and FIG. 3, the curved arrow depicted in each roll indicates the rotational direction of each roll.

The first roll 31 and the second roll 32 are rotated in opposite directions. The granulated material is supplied between the pair of rolls (first roll 31 and second roll 32), and the granulated material is compressed between the pair of rolls, to form the sheet-like electrode composite layer.

The temperature of at least one roll of the pair of rolls is 40° C. or higher. Namely, at least one roll of the first roll 31 and the second roll 32 is 40° C. or higher. By using the rolls, the granulated material is heated during compression, and the viscosity of the binder dissolved in the solvent contained in the granulated material is reduced. As the viscosity of the binder is reduced, the area of a portion of the surface of the electrode active material that is wetted by the solvent (or a mixture of the solvent and the binder), in the granulated material, is increased. Accordingly, the spreadability of the electrode active material is improved. The temperature of the roll means the temperature of the roll surface.

It is preferable that the temperatures of both of the pair of rolls are 40° C. or higher. Namely, it is preferable that the temperatures of both of the first roll 31 and the second roll 32 are 40° C. or higher. In this manner, the granulated material can be efficiently heated. The temperature of the third roll 33 may be 40° C. or higher.

The temperature of the roll is preferably 50° C. or higher, and preferably 70° C. or higher. The temperature of the roll may be 120° C. or lower, and may be 100° C. or lower.

The means of heating the rolls is not particularly limited. For example, a heater, etc. may be used. Examples of the heater include an infrared heater (IR heater), electric heater, and so forth.

The distance of the first gap is, for example, about 50 μm to 10 mm. The distance of the first gap is the linear distance between the first roll 31 and the second roll 32 at the position where the first roll 31 and the second roll 32 are closest to each other.

The feeder 2 is located right above the first gap between the first roll 31 and the second roll 32. In this process, the granulated material is first supplied to the feeder 2. The feeder 2 feeds the granulated material 10 to the first gap.

Figure 4:
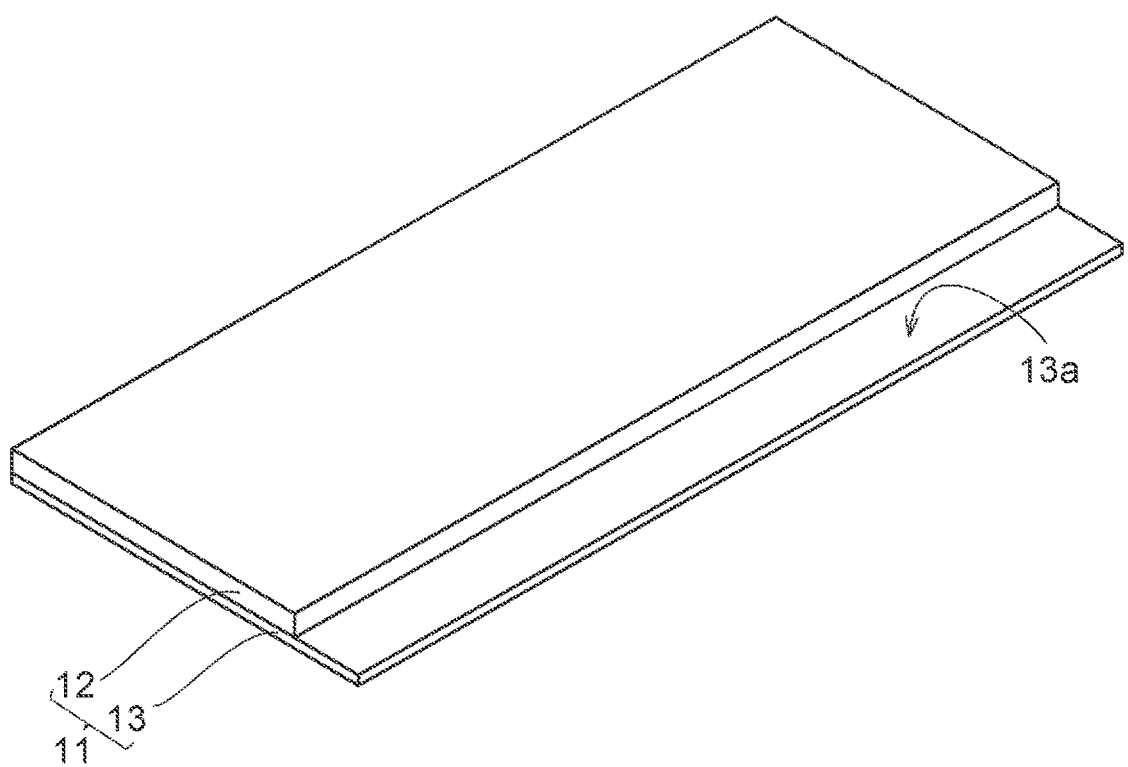
FIG. 4 is a schematic view showing one example of an electrode sheet.

The electrode manufacturing apparatus 3 further includes a pair of restriction plates 24 that are arranged in parallel with each other, with a predetermined spacing in the axial direction of the first roll 31 and the second roll 32. The granulated material 10 fed to the first gap is drawn downward of the first gap and passes through the first gap as the first roll 31 and the second roll 32 rotate (in the directions of the arrows in FIG. 2), with its width dimension limited by the pair of restriction plates 24. In this manner, the amount (mass per unit area) of the electrode composite layer 12 can be adjusted. With the pair of restriction plates 24 thus provided, exposed portions 13a on which the electrode composite layer 12 is not placed can be provided at the widthwise opposite ends of the electrode current collector 13 (see FIG. 4). The amount of the electrode composite layer 12 can also be adjusted by the distance of the first gap.

The rotational speed of the second roll 32 is preferably faster than the rotational speed of the first roll 31. For example, the rotational speed of the second roll 32 is about three times to five times the rotational speed of the first roll 31. By making the rotational speed of the second roll 32 faster than the rotational speed of the first roll 31, the granulated material is stretched more on the surface of the second roll 32 than on the surface of the first roll 31, as shown in FIG. 2, and the area of a liquid cross-linking portion of the granulated material in contact with the surface of the second roll 32 is larger than the area of that in contact with the surface of the first roll 31. As a result, the granulated material 10 (electrode composite layer 12) after rolling sticks to the second roll 32 side, and is conveyed by the second roll 32.

Placement Process (S30)

In the placement process, the electrode composite layer 12 is placed on the electrode current collector 13. For example, the sheet-like electrode composite layer 12 produced in the electrode composite layer formation process (S20) is transferred to the electrode current collector 13 (negative-electrode current collector), so that the electrode composite layer 12 is placed on the electrode current collector 13.

More specifically, as shown in FIG. 2 and FIG. 3, the electrode current collector 13 is conveyed on the third roll 33, and supplied to the second gap between the second roll 32 and the third roll 33. The electrode composite layer 12, after leaving the first gap between the first roll 31 and the second roll 32, is conveyed on the second roll 32, and supplied to the second gap. The second roll 32 and the third roll 33 are rotated in opposite directions (see the curved arrows in FIG. 2 and FIG. 3).

In the gap between the second roll 32 and the third roll 33, the electrode composite layer 12 is pressed against the electrode current collector 13, and adheres to the electrode current collector 13, away from the second roll 32. Namely, the electrode composite layer 12 is transferred from the second roll 32 to the electrode current collector 13. Thus, the electrode composite layer 12 conveyed on the second roll 32 and the electrode current collector 13 conveyed on the third roll 33 are fed to the second gap between the second roll 32 and the third roll 33, so that the electrode composite layer 12 is placed on the electrode current collector 13, to form an electrode sheet 11.

After the electrode composite layer 12 is dried, the electrode sheet 11 may be cut to a predetermined size using, for example, a slitter.

The electrode obtained by the manufacturing method of the disclosure can be used, for example, as an electrode of a secondary battery, such as a lithium-ion secondary battery (non-aqueous electrolyte secondary battery). The secondary battery, such as the lithium-ion secondary battery, can be used, for example, as a power supply of a hybrid electric vehicle (HEV), battery electric vehicle (BEV), plug-in hybrid electric vehicle (PHEV), or the like. However, the electrode obtained by the manufacturing method of the disclosure is not limited to such automotive applications, but can be applied to any use.

This embodiment will be described using some examples. However, the embodiment is not limited to these examples.

Example 1

An electrode (positive electrode) of Example 1 was produced in the following manner.
Granulated Material Preparation Process
  In Example 1, the following materials were first prepared.
  Positive-electrode active material: NCM (lithium nickel cobalt manganate) (average particle diameter (D50): 6 µm)
  Binder: polyvinylidene fluoride (PVDF)
The positive-material active material (95 mass parts), auxiliary agent (AB: 3.5 mass %), binder (1.5 mass parts), and solvent (NMP) were put into an agitation tank of a mixer (agitation granulator), and mixed together, to produce a granulated material. The amount of the solvent used was adjusted so that the solid content concentration of the granulated material was equal to 77 mass %.

To achieve a coating thickness of 4 µm, the target particle diameter of the granulated material was set to 4 mm (100 times the coating thickness) as the average particle diameter (D90), and the goal was to obtain the granulated material of which D90 was equal to or less than 4 mm. The "D90" means the particle diameter at 90% of the integrated value in the volume-based particle size distribution measured by the laser diffraction and scattering method.
Electrode Composite Layer Formation Process
  In this process, the sheet-like electrode composite layer 12 (positive-electrode composite layer) was formed from the above granulated material, using the electrode manufacturing apparatus 3 shown in FIG. 2 and FIG. 3 in the same manner as in the above embodiment. In the electrode manufacturing apparatus 3, the first roll 31 and the second roll 32 were heated to 40° C. by the IR heater.

In the electrode manufacturing apparatus 3, the distance between the first roll 31 and the second roll 32 (the distance of the first gap) is 50 µm. The distance between the second roll 32 and the third roll 33 (the distance of the second gap) is 20 µm. The diameter of each of the first roll 31, second roll 32, and third roll 33 is 100 mm, and the length of each of these rolls 31, 32, 33 is 200 mm.

Placement Process
  In this process, the electrode composite layer 12 as described above was placed on the electrode current collector 13, using the electrode manufacturing apparatus 3 shown in FIG. 2 and FIG. 3 in the same manner as in the above embodiment. The electrode current collector 13 (positive-electrode current collector) was an aluminum (Al) foil (thickness: 12 µm). By drying the electrode composite layer, the electrode (positive electrode) of Example 1 was produced.

Examples 2 to 8

In Examples 2 to 8, in the granulated material preparation process, the solid content concentration of the granulated material was controlled to be 78, 79, 80, 81, 82, 83, and 84 mass %, respectively. Otherwise, the electrodes of Examples 2 to 8 were produced in the same manner as that of Example 1.

Comparative Examples 1 to 8

In Comparative Examples 1 to 8, the first roll 31 and the second roll 32 were not heated. Otherwise, the electrodes of Comparative Examples 1 to 8 were produced in the same manners as those of Examples 1 to 8, respectively.
Spreadability Evaluation
  The electrodes of Examples 1 to 8 and Comparative Examples 1 to 8 were evaluated for spreadability. Specifically, the spreadability was evaluated in the following manner, using a spreadability evaluation device 60 as shown in FIG. 7.

Figure 7:
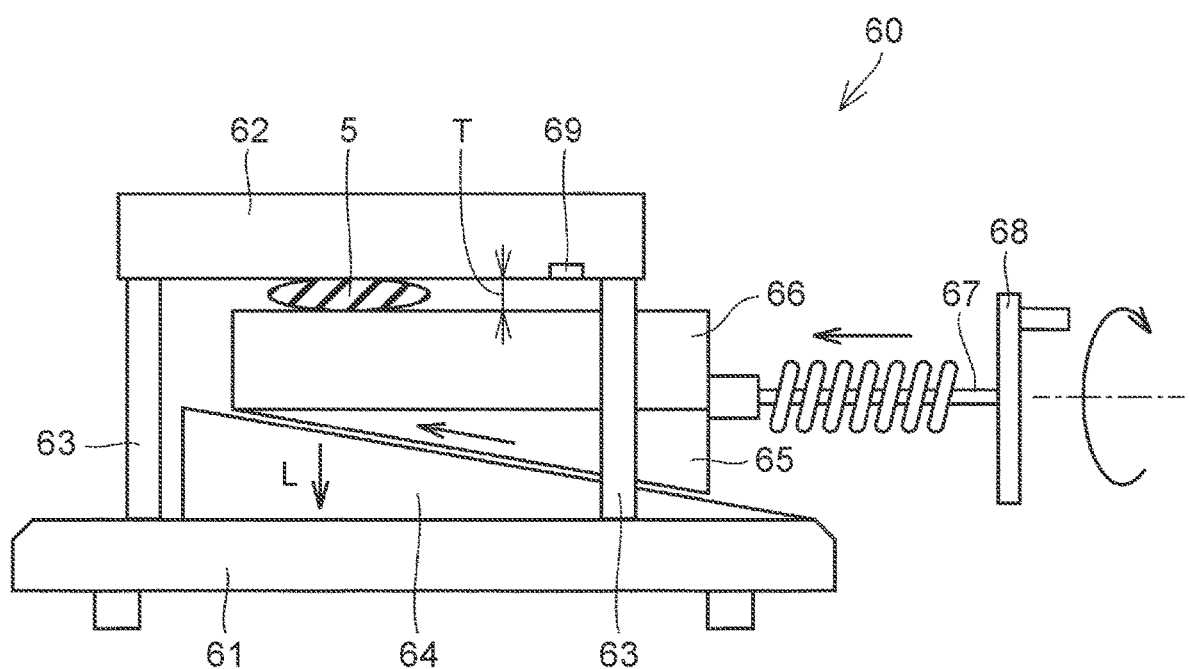
FIG. 7 is a schematic view showing a measurement device for measuring the spreadability evaluation value.

As shown in FIG. 7, the spreadability evaluation device 60 has a platform 61 with load cell. An upper plate 62 is fixed to the platform 61 with load cell via posts 63, 63. A lower wedge member 64 and an upper wedge member 65 are placed on the platform 61 with load cell. Each of the lower wedge member 64 and the upper wedge member 65 has a slope inclined at a predetermined angle, and the slope of the lower wedge member 64 and the slope of the upper wedge member 65, which are opposed to each other, are superposed on each other. On the upper wedge member 65, a lower moving plate 66 is installed such that it is integrated with the upper wedge member 65.

When a rotary shaft 67 is rotated with a handle 68, and the upper wedge member 65 and the lower moving plate 66 are moved to the left in FIG. 7, using a moving mechanism (not shown), the upper wedge member 65 and the lower moving plate 66 move along the slope of the lower wedge member 64, and also move upward. Namely, when the lower moving plate 66 moves to the left in FIG. 7 by a predetermined distance, it also rises upward in FIG. 7 by a predetermined level. In the spreadability evaluation device 60 used in Examples, etc., the angles of the slopes of the lower wedge member 64 and the upper wedge member 65 are set so that the lower moving plate 66 is lifted upward by 40 µm when the lower moving plate 66 is moved to the left (in the horizontal direction) in FIG. 7 by 15 mm.

When evaluating electrodes, first, the electrode composite layers (an aggregate of granules) of Examples 1 to 8 and Comparative Examples 1 to 8 produced were removed. Then, 0.5 g of the aggregate of granules thus removed was placed on the lower moving plate 66 of the spreadability evaluation device 60. Then, the handle 68 was rotated, so that the lower moving plate 66 was moved to the left in FIG. 7 at a speed of 15 mm/sec., and was lifted at a speed of 40 µm/sec. As a result, the granulated material on the lower moving plate 66 was spread between the upper plate 62 and the lower moving plate 66 while shearing force was applied to the granulated material, to form a granulated film 5.

During this spreading, the reaction force of the spreading of the granulated film 5 was applied to the platform 61 with load cell via the lower moving plate 66, upper wedge member 65, and lower wedge member 64, and the reaction force was measured as a load L. Also, a displacement sensor 69 provided on the upper plate 62 measured the distance between the upper plate 62 and the lower moving plate 66, namely, the thickness T of the granulated film 5.

For Examples and Comparative Examples, the thickness T (μm) of the granulated film 5 at the time when the load L was equal to 6.5 kN during movement of the upper wedge member 65 and the lower moving plate 66 to the left in FIG. 7 was measured as the spreadability evaluation value. As the spreadability evaluation value (μm) is smaller, the spreadability of the granulated material is higher (the granulated material is more likely to spread).

Figure 6:
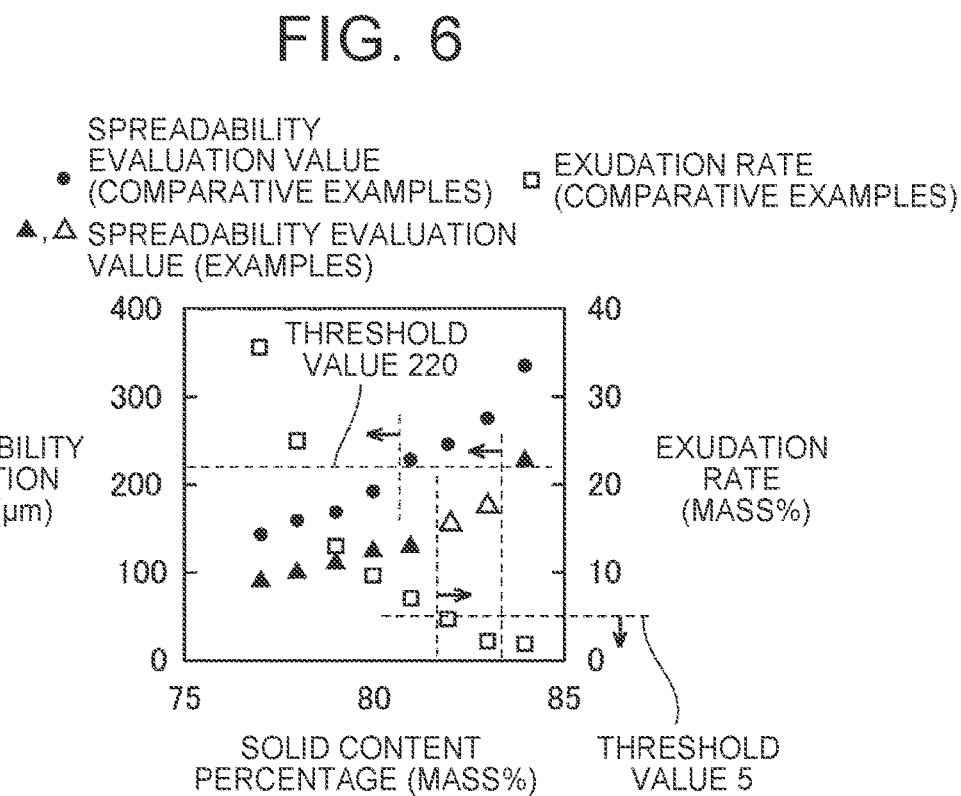
FIG. 6 is a graph showing the relationship between the solid content percentage, spreadability, and liquid retainability, for granulated materials of Examples and Comparative Examples.

The measurement results of the spreadability evaluation value (μm) of Examples and Comparative Examples are indicated in FIG. 6.

Liquid Retainability Evaluation

For the granulated materials of Comparative Examples 1 to 8, the exudation rate (mass %) as an indicator of the liquid retainability was measured when the granulated material was compressed. The exudation rate (mass %) is the percentage of the amount of solvent exuded when the granulated material is compressed to a density of 1.6 g/cc when pressed using a hydraulic press. The exudation rate is calculated according to the following expression.

("Amount of solvent contained in granulated material before compression"–"Amount of solvent contained in granulated material after compression")/"Amount of solvent contained in granulated material before compression"

As the exudation rate (mass %) is smaller, the liquid retainability of the granulated material is higher.

The measurement results of the exudation rate (mass %) of the granulated materials of Comparative Examples 1 to 8 are shown in FIG. 6. Since the liquid retainability is mainly determined by the solid content percentage of the granulated material, the liquid retainability of the granulated material of each of Examples 1 to 8 is considered to be substantially equal to the liquid retainability of the granulated material of the corresponding one of Comparative Examples 1 to 8.

It is understood from the results shown in FIG. 6 that the spreadability is improved in the granulated materials of Examples 1 to 8, compared to the granulated materials of Comparative Examples 1 to 8.

As described above with reference to FIG. 5, it was difficult to obtain a granulated material of which both the spreadability and the liquid retainability satisfy conditions necessary for easy manufacture of electrodes, only through adjustment of the material composition, etc. in conventional granulated materials (those of Comparative Examples). On the other hand, the granulated materials of Examples have improved spreadability while maintaining the liquid retainability, thus making it possible to provide granulated material having both good spreadability and good liquid retainability (see Examples 6 and 7 indicated by white triangles in FIG. 6), which facilitates manufacture of electrodes and improves productivity.

It is to be understood that the embodiment and examples disclosed herein are exemplary in all respects, and are not restrictive. The scope of the disclosure is indicated by the claims, rather than the above description, and is intended to include all changes within the claims and the meaning and range of equivalents thereof.

What is claimed is:

1. A method of manufacturing an electrode operatively associated with an apparatus, the method comprising:
    preparing a granulated material containing an electrode active material, a binder, and a solvent;
    heating a first roll, a second roll, and a third roll of the apparatus to a temperature equal to or higher than 40° C.;
    compressing the granulated material between the first roll and the second roll;
    forming an electrode composite layer;
    conveying an electrode current collector on the third roll; and
    pressing the electrode composite layer, onto the electrode current collector conveyed on the third roll.

2. The method according to claim 1, wherein the granulated material has a solid content percentage that is equal to or greater than 75 mass % and equal to or less than 90 mass %.

3. The method according to claim 1, further comprising adjusting a rotational speed of the second roll faster than a rotational speed of the first roll during compressing the granulated material between the first roll and the second roll.

4. The method according to claim 1, further comprising pressing the electrode composite layer onto the electrode current collector conveyed on the third roll, by passing the electrode composite layer through a first gap between the second roll and the third roll.

5. The method according to claim 4, further comprising:
    compressing the granulated material between the first roll and the second roll, by passing the granulated material containing through a second gap between the first roll and the second roll; and
    preparing the first roll, the second roll, and the third roll such that the first gap is 20 μm, and the second gap is 50 μm.

6. The method according to claim 1, further comprising preparing the electrode active material having an average particle diameter of 1 to 25 μm.

7. The method according to claim 1, further comprising preparing the first roll, the second roll, and the third roll, each having a diameter of 10 to 1000 mm and an axial length of 100 to 2000 mm.

8. The method according to claim 1, further comprising heating the first roll, the second roll, and the third roll to a temperature equal to or lower than 100° C.

9. The method according to claim 1, further comprising mixing water and a polar organic solvent to prepare the solvent.

10. The method according to claim 1, further comprising preparing the electrode active material including lithium metal oxides.

11. The method according to claim 1, further comprising preparing the binder including carboxymethyl cellulose, styrene butadiene rubber, polyvinylidene fluoride, polytetrafluoroethylene, and polyacrylic acid.

12. The method according to claim 1, further comprising
    preparing the electrode active material having an average particle diameter of 1 to 25 μm;
    preparing the first roll, the second roll, and the third roll, each having a diameter of 10 to 1000 mm and an axial length of 100 to 2000 mm;
    heating the first roll, the second roll, and the third roll to a temperature equal to or lower than 100° C.;

mixing water and a polar organic solvent to prepare the solvent;
preparing the electrode active material including lithium metal oxides;
preparing the binder including carboxymethyl cellulose, styrene butadiene rubber, polyvinylidene fluoride, polytetrafluoroethylene, and polyacrylic acid;
pressing the electrode composite layer onto the electrode current collector conveyed on the third roll, by passing the electrode composite layer through a first gap between the second roll and the third roll;
compressing the granulated material between the first roll and the second roll, by passing the granulated material containing through a second gap between the first roll and the second roll; and
preparing the first roll, the second roll, and the third roll such that the first gap is 20 μm, and the second gap is 50 μm.

\* \* \* \* \*